United States Patent
Kauniskangas et al.

(10) Patent No.: US 9,338,028 B2
(45) Date of Patent: May 10, 2016

(54) UTILIZING INFORMATION OF A LOCAL NETWORK FOR DETERMINING PRESENCE STATE

(75) Inventors: Hannu Kauniskangas, Oulu (FI); Kari Kaarela, Oulu (FI); Jukka Parkkinen, Oulu (FI); Mikko A. Hyvarinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 2876 days.

(21) Appl. No.: 11/455,904

(22) Filed: Jun. 19, 2006

(65) Prior Publication Data
US 2007/0291761 A1 Dec. 20, 2007

(51) Int. Cl.
| H04L 12/66 | (2006.01) |
| --- | --- |
| H04M 3/436 | (2006.01) |
| H04W 4/16 | (2009.01) |
| H04L 29/08 | (2006.01) |
| H04W 92/02 | (2009.01) |
| H04M 3/42 | (2006.01) |

(52) U.S. Cl.
CPC ............... *H04L 12/66* (2013.01); *H04L 67/04* (2013.01); *H04L 67/16* (2013.01); *H04L 67/24* (2013.01); *H04M 3/436* (2013.01); *H04W 4/16* (2013.01); *H04M 3/42365* (2013.01); *H04W 92/02* (2013.01)

(58) Field of Classification Search
USPC ............... 370/395.2, 338, 401, 503; 709/217; 455/414.3, 41.3
See application file for complete search history.

(56) References Cited

U.S. PATENT DOCUMENTS

| 6,816,912 | B1 | 11/2004 | Borella et al. |
| --- | --- | --- | --- |
| 7,155,305 | B2 * | 12/2006 | Hayes ................... G05B 15/02 340/447 |
| 8,908,699 | B2 * | 12/2014 | Karaoguz ............... H04L 12/66 370/401 |
| 9,008,293 | B2 * | 4/2015 | Qiu ................... H04M 3/42042 348/461 |
| 2001/0003191 | A1 | 6/2001 | Kovacs et al. |
| 2002/0061095 | A1* | 5/2002 | Beecroft ............ H04M 1/6033 379/110.01 |
| 2002/0133581 | A1 | 9/2002 | Schwartz et al. |
| 2003/0126239 | A1 | 7/2003 | Hwang |
| 2004/0072557 | A1 | 4/2004 | Paila et al. |

(Continued)

FOREIGN PATENT DOCUMENTS

| EP | 1198113 A1 | 4/2002 |
| --- | --- | --- |
| GB | 2388455 A | 11/2003 |

(Continued)

OTHER PUBLICATIONS

Mexican Office action for corresponding MX application No. MX/a/2008/015700 dated Jan. 28, 2011, pp. 1-8.

(Continued)

*Primary Examiner* — Khawar Iqbal
(74) *Attorney, Agent, or Firm* — Ditthavong & Steiner, P.C.

(57) ABSTRACT

Utilizing information of a local network for determining presence state involves coupling a mobile device to a local, ad-hoc, peer-to-peer network. State information of a data-processing device of the network is determined using the mobile device. A presence state is formed at the mobile device based on the state information of the data-processing device. The presence state indicates conditions under which the mobile device may be contacted. In one configuration, a connection request for user communications may be received at the mobile device. The mobile device may respond to the connection request based on the presence state of the mobile device.

33 Claims, 7 Drawing Sheets

(56) References Cited

U.S. PATENT DOCUMENTS

| | | | |
|---|---|---|---|
| 2004/0123321 A1* | 6/2004 | Striemer | G06Q 20/3674 |
| | | | 725/62 |
| 2004/0214617 A1* | 10/2004 | Kanazawa | H04L 12/2823 |
| | | | 455/574 |
| 2005/0193106 A1 | 9/2005 | Desai et al. | |
| 2005/0220139 A1 | 10/2005 | Aholainen | |
| 2005/0232186 A1 | 10/2005 | Karaoguz et al. | |
| 2006/0002320 A1 | 1/2006 | Costa-Requena et al. | |
| 2006/0041648 A1 | 2/2006 | Horvitz | |
| 2006/0116114 A1* | 6/2006 | Kadado | H04M 3/42042 |
| | | | 455/415 |
| 2006/0121923 A1* | 6/2006 | East | H04M 3/42374 |
| | | | 455/518 |
| 2006/0128364 A1 | 6/2006 | Costa-Requena et al. | |
| 2006/0199536 A1* | 9/2006 | Eisenbach | 455/41.2 |
| 2006/0199621 A1* | 9/2006 | Stirbu et al. | 455/574 |
| 2006/0242304 A1* | 10/2006 | Hirose et al. | 709/227 |
| 2007/0049255 A1* | 3/2007 | Bhakta | H04W 88/02 |
| | | | 455/412.2 |
| 2007/0136778 A1* | 6/2007 | Birger | G11B 19/025 |
| | | | 725/117 |
| 2007/0186002 A1* | 8/2007 | Campbell | H04N 7/142 |
| | | | 709/231 |
| 2007/0226311 A1* | 9/2007 | Kaarela et al. | 709/217 |
| 2007/0245384 A1* | 10/2007 | Walter et al. | 725/62 |
| 2007/0254634 A1* | 11/2007 | Costa-Requena | H04W 8/245 |
| | | | 455/412.1 |
| 2007/0263853 A1* | 11/2007 | Pearson | H04M 1/2745 |
| | | | 379/413.03 |
| 2007/0287438 A1* | 12/2007 | Hansen et al. | 455/417 |
| 2008/0137631 A1* | 6/2008 | de Clerq et al. | 370/338 |
| 2009/0103535 A1* | 4/2009 | McCoy et al. | 370/392 |

FOREIGN PATENT DOCUMENTS

| | | |
|---|---|---|
| JP | 5-56190 A | 3/1993 |
| JP | 11-17839 A | 1/1999 |
| JP | 2004-179862 A | 6/2004 |
| JP | 2004179863 A | 6/2004 |
| JP | 2006-5453 A | 1/2006 |
| JP | 2006-20304 A | 1/2006 |
| JP | 2006-157166 A | 6/2006 |
| WO | WO 2007107863 | 9/2007 |

OTHER PUBLICATIONS

Japanese Office Action for corresponding JP Application No. 2009-515975, Aug. 16, 2011, pp. 1-9.

Mexican Office action for corresponding MX Application No. MX/a/2008/015700, Jul. 12, 2011, pp. 1-6.

Japanese Office Action for related Japanese Application No. 2009-515975 dated Feb. 28, 2012, pp. 1-6.

Supplementary European Search Report for corresponding EP application No. 07734458, mailed Dec. 2, 2013, 6 pages.

Office Action for corresponding Japanese Patent Application No. 2012-145105, date mailed Aug. 27, 2013, 5 pages. (English Language Summary included).

Office Action for corresponding Japanese Patent Application No. 2014-191462 dated Aug. 4, 2015, with English-language summary, 8 Pages.

Office Action for corresponding Japanese Patent Application No. 2014-191462, dated Jan. 26, 2016, with English-language summary, 3 Pages.

* cited by examiner

UTILIZING INFORMATION OF A LOCAL NETWORK FOR DETERMINING PRESENCE STATE

FIELD OF THE INVENTION

This invention relates in general to computing devices, and more particularly to determining presence state of computing devices based on information of a local network.

BACKGROUND OF THE INVENTION

Mobile devices are constantly gaining in processor power and memory. As this capability grows, so does the functionality that may be included on such devices. Added functionality is often designed to enhance the primary communications modes in which the devices are used. These communication modes include telephonic communications via cellular and landline infrastructures, telephonic communications using packet switched data networks (e.g., Voice over Internet Protocol), text and instant messaging, email, multimedia message transfer etc. However, such devices may have features (such as games) that are unrelated to the primary communication modes of the device.

Another set of mobile features that are typically unrelated to primary communications are those features used for communicating on home networks. For example, a mobile device may be able to communicate with other devices of a local network using Universal Plug and Play™ (UPnP). UPnP defines an architecture for pervasive, peer-to-peer networking between all types of consumer electronics, including intelligent appliances, wireless devices, and PCs of all form factors. UPnP technologies provide a way for disparate processing devices to exchange data via proximity or ad hoc networks. The UPnP framework is designed to bring easy-to-use, flexible, standards-based connectivity to ad-hoc or unmanaged networks whether in the home, in a small business, public spaces, or attached to the Internet. UPnP technologies provide a distributed, open networking architecture that leverages TCP/IP and the Web technologies to enable seamless proximity networking in addition to control and data transfer among networked devices.

The UPnP Device Architecture (UDA) is designed to support zero-configuration, "invisible" networking, and automatic discovery for a breadth of device categories from a wide range of vendors. This means a device can dynamically join a network, obtain an IP address, convey its capabilities, and learn about the presence and capabilities of other devices. The UPnP specification includes standards for service discovery. Various contributors publish UPnP device and service descriptions, thus creating a way to easily connect devices and simplifying the implementation of networks. It is the goal of UPnP to enable home electronics to seamlessly interact, thus furthering the usefulness of such devices.

The UPnP standard includes standards for service discovery, and is mainly targeted for proximity or ad hoc networks. Various contributors publish UPnP device and service descriptions, thus creating a way to easily connect devices and simplifying the implementation of networks. UPnP is designed to work in many environments, including the home, businesses, public spaces, and on devices attached to the Internet. The UPnP standard is an open architecture that leverages Web technologies and is designed to provide ad-hoc networking and distributed computing.

UPnP and related protocols were developed primarily to allow consumers to easily assemble a home network, and to access and control devices not normally associated with networked computing. However, the flexible nature of UPnP means that it can be implemented anywhere, and can be adapted to uses not foreseen by the originators of the network framework. For example, UPnP can be used on mobile devices that normally connect to wireless provider networks. Such devices may contain secondary wired or wireless interfaces that allow the devices to communicate with other entities of home or business networks.

When UPnP features are included on mobile devices, there may be a disconnect between the UPnP functions and the primary mode functions. For example, a UPnP capable mobile phone has a display and keypad, and therefore may be configured as a UPnP Control Point for controlling other devices. However, using a mobile device as a UPnP Control Point does not, by itself, allow the UPnP network to take advantage of the primary communications modes of the device. Similarly, a Control Point interface does not, by itself, utilize the capabilities of other entities in the UPnP network to enhance the primary communications modes of the mobile device. As discussed in greater detail hereinbelow, integrating the primary functions of a mobile device with ad-hoc, peer-to-peer protocols such as UPnP is desirable.

SUMMARY OF THE INVENTION

To overcome limitations in the prior art described above, and to overcome other limitations that will become apparent upon reading and understanding the present specification, a system, apparatus, and method is described for utilizing information of a local network for determining presence state and/or context. In one embodiment, a method involves coupling a mobile device to a local, ad-hoc, peer-to-peer network. State information of a data-processing device of the network is determined using the mobile device. The mobile device forms a presence state based on the state information of the data-processing device. The presence state indicates conditions under which the mobile device may be contacted.

In more particular embodiments, the method further involves receiving, via a mobile communications network, a connection request for user communications at the mobile device, and responding to the connection request via the mobile device based on the presence state of the mobile device. Responding to the connection request based on the context of the mobile device may involve rejecting the connection request, sending a predetermined busy message to an originator of the connection request, and/or changing a user alert associated with the connection request. Changing the user alert associated with the connection request comprises redirecting the user alert to a device of the network. Receiving the connection request for user communications at the mobile device may include receiving a request for at least one of a phone call, a text message, a calendar notification, and a device status notification.

In other more particular embodiments, the method further involves controlling the data-processing device via the mobile device, and wherein determining the state information of the data-processing device comprises determining the state information based on control actions initiated via the mobile device. The data-processing device may include a media playback device, and determining the state information based on the control actions initiated via the mobile device may involve determining the state information based on a playback state of the media playback device. Coupling the mobile device to the local, ad-hoc, peer-to-peer network may involve coupling the mobile device to a Universal Plug and Play network. The mobile device may include at least one of a mobile phone, a personal digital assistant, a media playback device, a digital camera, a global position satellite navigation unit, and a game device. The data-processing device may include at least one of a television, a gaming console, a personal computer, a server, a data storage device, a video camera, an audio playback device, a video playback device.

In another embodiment of the invention, an apparatus includes a first network interface capable of communicating via a mobile communications network and a second network interface capable of communicating via a local network using an ad-hoc, peer-to-peer network protocol. A processor is coupled to the first and second network interfaces, and a memory is coupled to the processor. The memory includes instructions that cause the processor to determine, via the second network interface, state information of a data-processing device of the local network, and determine, based on the state information of the data-processing device a presence state that indicates conditions under which the apparatus may be contacted.

In more particular embodiments, the memory further causes the processor to receive a connection request for user communications via the first network interface, and respond to the connection request via the first network interface based on the presence state. Receiving the connection request for user communications may involve receiving a request for at least one of a phone call, a text message, a calendar notification, and a device status notification.

In other more particular embodiments, the apparatus further include a control module capable of controlling the data-processing device via the local network, and wherein the instructions cause the processor to determine the state information of the data-processing device based on control actions initiated via the control module. In one arrangement, the data-processing device may include a media playback device, and the instructions cause the processor to determine the state information based on a playback state of the media playback device. The local network may include a Universal Plug and Play network, and the mobile communications network may include a cellular phone network. The apparatus may include at least one of a mobile phone, a personal digital assistant, a media playback device, a digital camera, a global position satellite navigation unit, and a game device, and the data-processing device may include at least one of a television, a gaming console, a personal computer, a server, a data storage device, a video camera, an audio playback device, a video playback device.

In another embodiment of the invention, a computer-readable medium has instructions stored thereon which are executable by an apparatus capable of being coupled to a mobile communications network and a local network. The instructions are executable for performing steps that include determining state information of a data-processing device of the local network using an ad-hoc, peer-to-peer protocol, and determining, based on the state information of the data-processing device, a presence state that indicates conditions under which the apparatus may be contacted.

In more particular embodiments, the steps further involve receiving a connection request for user communications via the mobile communications network, and responding to the connection request via the mobile communications network based on the presence state.

In another embodiment of the invention, a system includes a local network that supports communications using an, ad-hoc, peer-to-peer protocol. A data processing device is coupled to the local network using the ad-hoc peer-to-peer protocol. A mobile device is capable of being coupled to the local network using the ad-hoc peer-to-peer protocol and capable of receiving connection requests via a mobile communications network. The mobile device includes a memory coupled to a processor. The memory includes instructions that cause the processor to determine, via the ad-hoc peer-to-peer protocol, state information of the data-processing device, and determine, based on the state information of the data-processing device, a presence state that indicates conditions under which the mobile device will accept the connection requests.

In another embodiment of the invention, a system includes means for coupling a mobile device to a local, ad-hoc, peer-to-peer network; means for determining state information of a data-processing device of the network using the mobile device; and means for forming, at the mobile device, a presence state based on the state information of the data-processing device, wherein the presence state indicates conditions under which the mobile device may be contacted.

In another embodiment of the invention, an apparatus includes a network interface capable of communicating via a local network using an ad-hoc, peer-to-peer network protocol. A processor is coupled to the network interface, and a memory is coupled to the processor. The memory includes instructions that cause the processor to determine, via the network interface, state information of a data-processing device of the local network, and determine, based on the state information of the data-processing device, a presence state that indicates conditions under which the apparatus may be contacted.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Mobile communications devices such as cellular phones, personal digital assistants (PDA), mobile navigation devices, and mobile email readers, typically have a primary set of communications modes. These modes may rely on wireless provider networks (e.g., cellular phone/data networks), satellite networks, short range wireless infrastructure (e.g., 802.11 wireless networking), although such devices may also be capable of engaging in wired communications as well. The media that is communicated using these primary communications modes includes voice, video, radio and television broadcasting, still images, text, vector graphics, telemetry, etc.

One common feature of these communication modes is that users may get asynchronous indicators of incoming communication requests, such as a ring tone indicating an incoming call. These indicators are asynchronous because they don't require the user to perform any specific actions to receive the requests, other than turning the device on. Although these indicators are highly useful in effecting immediate communication, they can often be disruptive during more certain occasions, such as meetings, funerals, etc. Similarly, simply turning the device off may also be undesirable in some cases, such as where someone is trying to contact the recipient regarding an urgent matter. In order to better manage how and when users can be contacted, a technology known as "presence" has been developed.

Generally, "presence" or "context" refers to a range of technologies that are used to determine the location, willingness to communicate, and other parameters relating to real-time or near real-time communications. Presence technology generally refers to applications and services that facilitate location and identification of one or more endpoints to such communication links. For example, if a user of a wireless, handheld device would like to initiate an IM session with another IM user, presence services may be used to present users' willingness to receive IM messages. Presence services are an integral part of third generation (3G) wireless networks, and are intended to be employed across a wide variety of communication devices.

One example of currently implemented presence technology includes the concepts of presentities, presence servers, and watchers. Generally, a presentity can provide information as to its "presence" (e.g., location, willingness to communicate at a certain time or with certain users, etc.). This information can be collected and utilized by presence servers, that can notify authorized "watchers" who are interested in presence information that certain presence information is available. Presence services may require the services of a well-known location server or similar database in order to determined presence state of end-user device.

In typical implementations, presence technologies require some manner of user input to determine the current presence state. For example, the user may make a selection on a user interface (UI) of a portable device before entering a meeting. This will cause the user's presence state to be updated to "busy," and incoming connection requests will be handled per the user's predetermined policies. One problem with this, however, is that the user may not always remember to make changes to the presence state before entering the meeting, leading to an unwanted interruption during the meeting. In order to improve upon manners of updating presence data, systems of the present invention can automatically change presence state based on the state of other data processing devices or applications in a local networking environment.

Generally, the present invention relates to methods, systems, and apparatus for modifying user presence data based on state data of other devices coupled to a local network. In particular, the device data can be obtained from devices of a Universal Plug and Play (UPnP) network, or other ad-hoc, peer-to-peer network. Many aspects of determining device state will be described herein in terms of UPnP and related protocols. However, those skilled in the art will appreciate the invention may be equally applicable to other ad-hoc, peer-to-peer network technologies. For example, protocols such as Service Location Protocol (SLP), and Jini, may perform functions that are similar to those of UPnP.

UPnP-enabled devices (e.g., media rendering devices), may be controlled by other UPnP-enabled devices (e.g., a mobile device acting as a Control Point). In such an arrangement, a UPnP mobile device can determine state data of the controlled device based on controller commands sent to the controlled device. In other arrangements, the mobile device may determine the state of the network device by using such mechanisms as UPnP service discovery. Regardless of how the device state is discovered, the mobile device can utilize the state information of these devices to change presence state associated with the mobile device and/or its user. In this way, the response of the mobile device to incoming connections, and other functions controlled by presence, are affected by the state of devices in the local environment.

Figure 1:
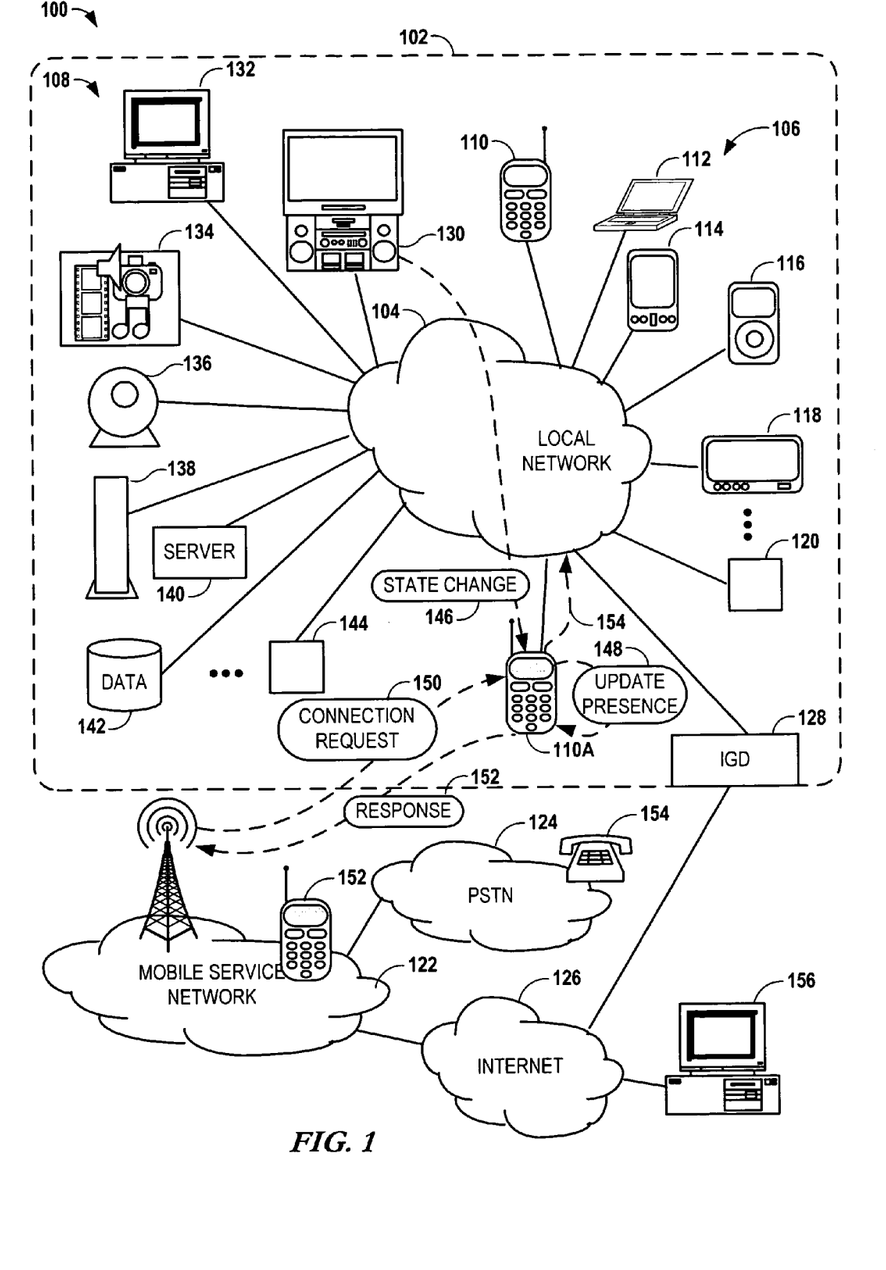
FIG. 1 is a block diagram illustrating a system according to embodiments of the invention.

In reference now to FIG. 1, a system 100 according to embodiments of the invention is illustrated. Generally, a local environment 102 includes a network 104. The local network 104 may include any combination of data transmission media and protocols. For example, the network 104 may utilize wired or wireless data transmission media. Similarly, devices 106, 108 on the local network 104 may various physical and data link layer protocols to intercommunicate, including, Ethernet, FDDI, PPP, ATM, HDLC, Fibre Channel, X-10, serial/parallel point-to-point connections, etc. A number of higher layer network protocols may operate on the network 104 as well, including TCP/IP, UDP/IP, IPX, Appletalk, ICMP, ARP, SNMP, DNS, FTP, NetBEUI, etc.

In one embodiment, the network 104 includes one or more UPnP devices that intercommunicate via ad-hoc, peer-to-peer connections on the network 104. Although concepts of the present invention may be described in terms of UPnP networks, those familiar with the applicable art will appreciate that these concepts may be applied to any manner of ad-hoc, peer-to-peer networking arrangement suitable for consumer or business networks. The devices on the illustrated network 104 are divided into two general categories, mobile devices 106 and general data processing devices 108. These categories 106, 108 are presented for purposes of discussion, and those skilled in the art will appreciated that devices in either category may 106, 108 perform functions of devices in the other category 108, 106.

Generally, the mobile devices 106 are capable of receiving connection requests targeted for users carrying the devices 106. As such, the mobile devices 106 may serve as an entry point for managing presence data of the user. Mobile devices 106 may include mobile phones 110, portable computers 112, personal digital assistants (PDA) 114, music/video players 116, navigation devices (e.g., GPS receivers) 118, and any other device, as represented by generic mobile device 120. Any of these devices 106 may be carried with users, and thus may already contain a UI capable of setting presence states for the user.

Generally, the mobile devices 106 are capable of communicating via the UPnP network 104. The mobile devices 106 may also communicate with other networks, such as the mobile service network 122, Internet 126, and public switched telephone network (PSTN) 124. In the illustrated example, mobile phone 110A is able to access the mobile services network 122 directly, and through that network 122 access other networks 124, 126. In other arrangements, one of the mobile devices 106 may access any one of the networks 122, 124, 126 via the local network 104, such as by utilizing a gateway device 128. In this example, the gateway device 128 is configured as a UPnP Internet Gateway Device (IGD) that provides Internet access services to other UPnP devices on the network 104.

The general purpose devices 108 that are also coupled to the local network 104 include audio-video (AV) equipment 130, desktop computers 132, media servers 134, digital video and/or still cameras 136, game consoles 138, servers 140, network-attached storage (NAS) 142, televisions, displays, LCD projectors, set-top box (STB) devices, digital video recorders (DVR), and other devices as represented by generic data processing device 144. Generally, these generic devices 108 interact with the user at some level, and thus can be used to determine activities of the user.

For example, when the AV system 130 is playing a movie, this is an indicator that the user is probably watching the movie, and a presence module on a mobile device 106 can use this indicator to tailor presence behaviors according to the preferences of the user. The state of the AV system 130 can be communicated to a mobile device (e.g., device 110A) via state change message 146 to signal this activity. In response to this state change message 146, the mobile device 110A updates 148 its internally maintained presence state. This update 148 may also involve communicating a state change to devices on other networks 122, 124, 126, such as a presence server or watcher (not shown).

After the presence state is updated 148, a connection request 150 may be received at the mobile device 110A. This request 150 may be received via any of the external network(s) 122, 124, 126, and may originate from devices such as a mobile device 152, a landline phone 154, or a computer 156, although the request may also originate from a device on the local network 104. The connection request 150 often requires immediate action by the user, particularly in the case of a phone call or text message. Therefore, the user would normally be alerted by the device 110A, such as by a ring tone. However, the device 110A is configured to first check the presence state of the user before responding to the connection request 150. Based on a presence state that is determined, at least in part, on states of the general-purpose devices 108, the user device 110A can respond appropriately.

This presence-tailored response may include sending a response message 152 to the originator of the request 150. The response message 152 may signal a rejecting of the connection request, acceptance of the connection, request for alternate mode of communication, and/or asking for details (e.g., identity, purpose of connection) before proceeding. The device 110A may also alter its own response actions or cause a change in other devices of the network 104 based on presence. For example, the device 110A may change the type of indicator (e.g., vibration versus ringing) based on presence state, and/or may direct data to another device of the network 104, as indicated by path 154. For example, the mobile device 110A may use a UPnP service of the AV system 130 in order to play a ringtone through speakers of the system 130, and/or to show a caller identifier on a video display of the system 130.

Generally, updating mobile device presence data based on other devices of the network 104 and responding to presence state using other devices of the network 104 can be implemented using any collection of compatible devices coupled via the network 104 or via some other data communication medium. Where the mobile devices 106 and general purpose devices 108 are UPnP enabled, the devices may already be interacting according to one or more UPnP roles. For example, UPnP Audio Video (AV) is a specialized area of UPnP intended for the digital distribution of entertainment content throughout a home/office network. UPnP AV deals with three specific logical entities, Media Server, Media Renderer, and Control Points. The UPnP Control Points are devices that allow users to select media available from the Media Server and direct selected media to be rendered on the Media Renderer. In the illustrated system 100, the mobile devices 106 can be particularly useful as UPnP Control Points because they are small devices having UI hardware (e.g., buttons, displays). The general purpose devices 108 can serve, either individually or in concert, as UPnP Media Servers and Renderers, generally storing and rendering media to the user.

In a UPnP AV system, a mobile device 106 acting as a Control Point can set states of the general-purpose devices 108 in response to user inputs. Therefore, such a mobile device 106 may be in the best position to determine the present states of the general purpose devices 108 that are being actively controlled. However, even where the mobile device 106 is not actively controlling a general purpose device 108, the state may still be determined by the mobile device 106. For example, the mobile device 106 may still use a UPnP Control Point interface to prompt for device states even without the input of the user. In a more generic UPnP arrangement, the general purpose devices 108 may advertise state data using UPnP discovery.

The UPnP specification includes standards for service discovery. Various contributors publish UPnP device and service descriptions on the network, thus creating a way to easily connect devices and simplifying the implementation of networks. The publishing and discovery of services and devices is accomplished using the Simple Service Discovery Protocol (SSDP). SSDP uses multicast message to provide a mechanism for network clients to discover network services without relying on a server or other authoritative network element. Devices advertise available services on the network by multicasting SSDP discovery messages, both when initially joining the network, and periodically thereafter. Devices can use discover network services by listening to these SSDP, as well as by using SSDP search messages. The use of SSDP in advertising and discovering services allow components of to spontaneously interact, and do so without heavily relying on static configurations or authoritative servers.

In the illustrated system 100, the general purpose devices 108 may advertise the availability of state data using SSDP multicast messages. The mobile devices 106 can obtain the state data directly from the SSDP messages, or as commonly implemented, the devices 106 can use the messages to begin further queries directed to the general purpose devices 108 in order to determine their state. Thus, the mobile devices 106 can be configured to determine the correct presence state without any Control Point interactions. For example, if generic device 144 is a UPnP capable lamp, the lamp 144 could advertise its "on" or "off" state using SSDP:alive messages. In conjunction with other data (e.g., time of day, when lamp was turned on), the user's mobile device 106 could make the appropriate presence changes when, for example, the user turns off the lamp 144 to go to sleep.

Figure 2:
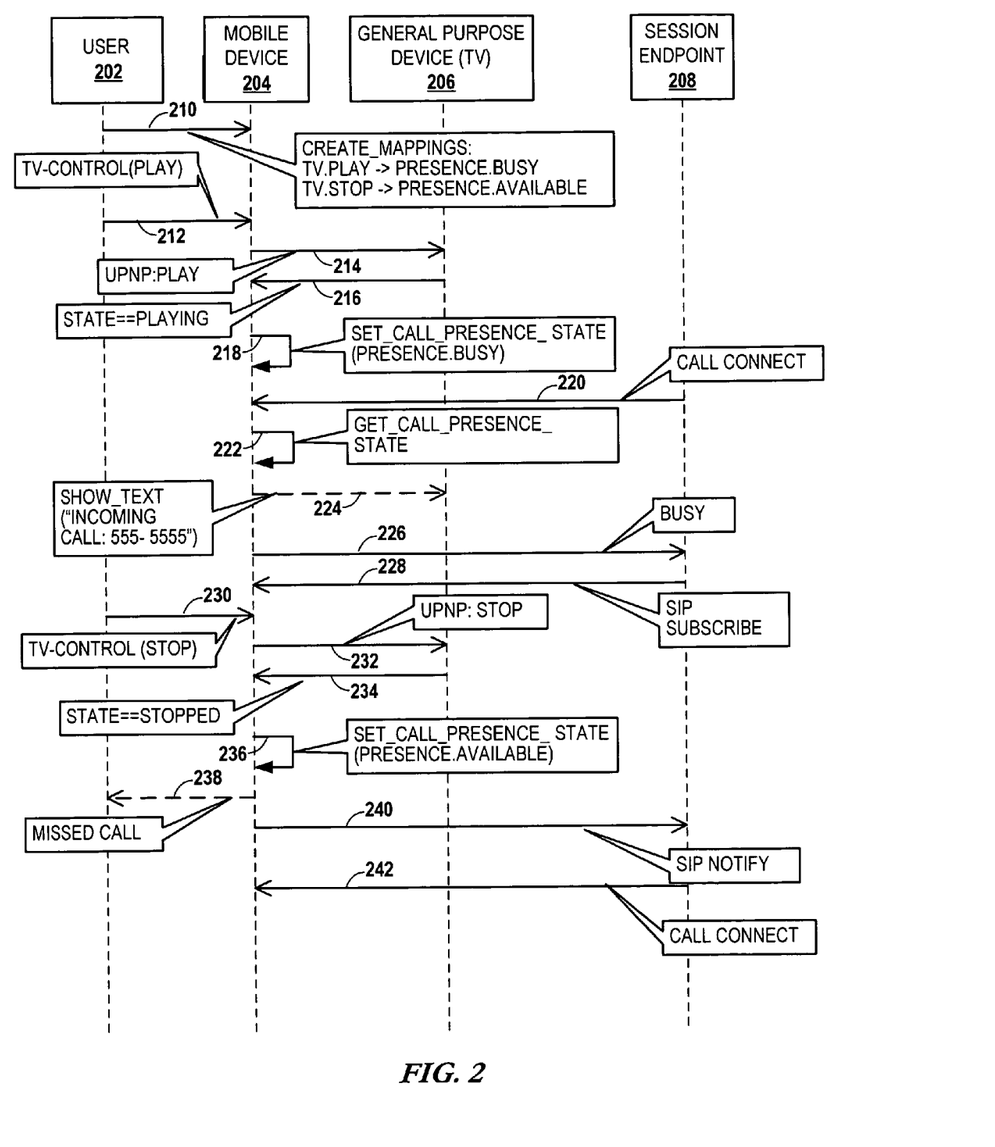
FIG. 2 is a sequence diagram that illustrates updating presence data using control functionality according to embodiments of the invention.

In reference now to FIG. 2, a sequence diagram illustrates a more detailed example of determining and using contextual presence according to embodiments of the invention. This figure shows interactions between a user 202, a mobile device 204, a general purpose device 206 (e.g., a TV) that are co-located in a local networking environment. The general purpose device 206 and mobile device 204 are coupled to the local network, and the mobile device 204 is also capable of communicating with a remote session endpoint 208, either directly (e.g., through a mobile services network) or via the local network.

In the illustrated sequence diagram, the user 202 is utilizing the mobile device 204 as a UPnP Control Point for controlling the TV 206, as is known in the art. Before the mobile device 204 can alter presence settings based on states of the TV 206, the user may need to configure the device 204, as indicated by the creation of mappings 210. The mappings 210 are used to link states of the generic devices 206 with presence states associated with the user 202 and/or device 204. The illustrated mappings 210 indicate that a "play" state of the TV 206 corresponds to a "busy" state, and a "stop" state of the TV 206 corresponds to an "available" state. It will be appreciated that numerous other device and presence states may be involved in the mapping 210, and additional mappings may also be applied. For example, there may be a mapping of responses of the mobile device 204 to incoming connections for each defined presence state.

In the illustrated example, the mobile device 204 is configured as a UPnP Control Point. Thus the user 202 uses the mobile device 204 to control the TV 206, as shown by user "play" command 212 and UPnP Play command 214. When confirmation 216 of the TV's state is received by the mobile device 204, the presence can be updated 218. The updating 218 of presence or context may also involve changing a state of a remote device, such as a presence server (not shown). This updated presence state is utilized by the mobile device 204 to handle any incoming connections, such as connection request 220.

The connection request 220 can be any type of connection request originating from a session endpoint 208. The request 220 does not have to be related to a "session" per se, but is at least the type of request that might require some sort of immediate user response if presence state were not taken into account. Such connection requests may include phone calls, instant messaging, video teleconferencing, email, news feeds, paging requests, etc. The illustrated incoming connection request 220 is for a phone call. Before further processing the call request 220, the mobile device 204 checks 222 the current presence state. The user 202 may have defined some predefined action for calls in this state. One option that the user 202 may utilize is to have a notification 224 (e.g., sound, image, text) sent to the TV 206 via UPnP. Often, the mobile device 204 may perform some sort of automatic response to the requestor 208, such as the illustrated busy message 226.

The user of the session endpoint 208 may also take some manual or automatic action relative to the response message 226. Here, the session endpoint subscribes 228 to a notification of when presence changes to "available" or similar state via the Session Initiation Protocol (SIP) or related session protocols. The subscription 228 may either be directly with the mobile device 204, or may be with some other service entity, such as a presence server (not shown).

At some later time, the user may initiate a "stop" command to the TV 206 via the mobile device 204, as shown by messages 230 and 232. These commands 230, 232 may be in response to stopping a program (e.g., DVR playback), turning TV power off, etc. When the mobile device 204 gets confirmation 234 of the state change, the local presence data is updated 236. The mobile device 204 may have an optional action associated with the change in device 234 and/or presence state 236, such as informing 238 the user 202 of the missed call. The mobile device 204 may also inform any subscribers of the presence state change, such as the notify message 240 sent to the session endpoint 208. Thereafter, the user of the endpoint 208 can attempt to reconnect 242 with the user, who is now available.

Although a UPnP Control Point is ideally suited to determine state of locally coupled devices, a mobile device according to embodiments of the invention do not necessarily need to be configured as a Control Point to determine device states. In reference now to FIG. 3, a sequence diagram illustrates an alternate example of determining and using contextual presence according to embodiments of the invention. As in the previous example, a user 302 has access to mobile device 304 that is locally coupled to a general-purpose device 306 using a network protocol such as UPnP. Also on the local network is an alternate communications device 308, that may be locally situated, but does not necessarily need to be coupled to the UPnP network. The alternate communications device 308 may be a PSTN or SIP telephone, personal computer, etc. The mobile device 304 and the alternate communications device 308 are both capable of communicating with a session endpoint 310 via the appropriate external networks (e.g., PSTN, Internet, mobile services network, etc.).

Figure 3:
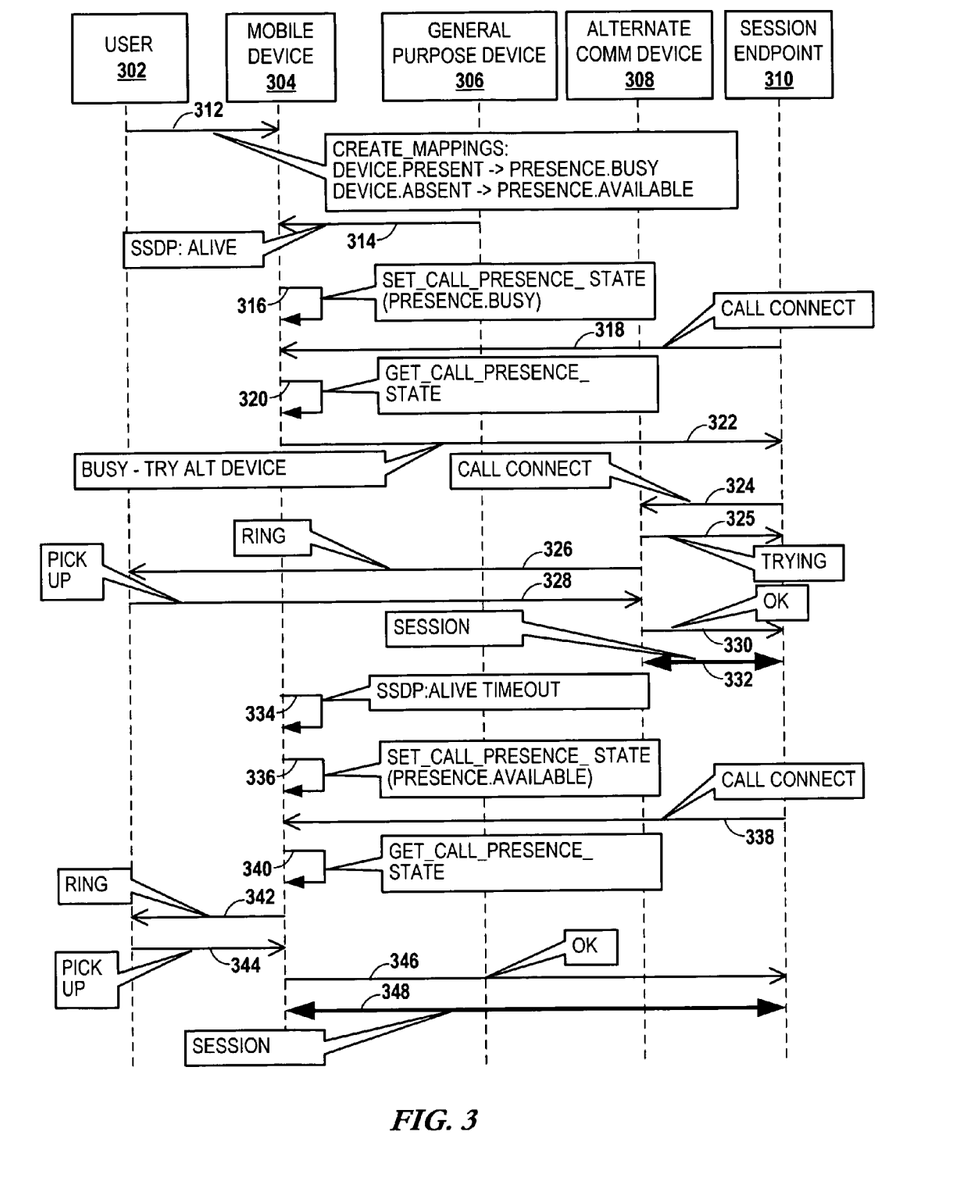
FIG. 3 is a sequence diagram illustrates updating presence data using service advertisements according to embodiments of the invention.

In this example, the mobile device 304 need not be configured as UPnP Control Point, but may at least be configured to process SSDP announcements (or similar service advertisements) from the general-purpose device 306. These announcements may provide any amount of data relating to device state, but in this example, just the existence of the device 306 is sufficient. This may be useful where the user 302 wishes to automatically have calls forwarded to the alternate device 308 when within detection distance of the general-purpose device. For example, the user 302 may be on a limited hours plan for the mobile device, and wish to have phone calls sent to a landline phone 308 when at home. Similarly, the user 302 may work in an office tower where cell phone reception is poor, and wish to have cell phone calls routed to a landline phone or SIP software of a personal computer when in the office so that calls are not dropped. In these examples, any general-purpose device 306 that is located within the desired physical range and detectable by the mobile device 304 will suffice to alter user presence, assuming the device 306 is powered on and functioning.

As in the previous example, the user 302 will create mappings 312 between various device states and presence states. Here the mappings 312 are based on the device being present or absent, but any state that can be continually advertised by the general-purpose device 306 may be used in the mapping 312. When the mobile device 304 first detects an advertisement 314 from the device 306 (e.g., SSDP Alive message), then the internal presence state can be changed 316. Thereafter, when a connection request 318 is received, either at the mobile device itself 304 or by an intermediary that can access presence data, the presence state is determined 320 and the appropriate reply 322 sent back. In this case, the reply 322 indicates that the originator 310 should try the alternate device 308.

The session endpoint 310 may have the connection automatically forwarded to the alternate device 308 in response to the reply 322, or may connect 324 on its own. Thereafter, the session endpoint 310, alternate device 308, and user 302 continue exchanging messages/commands 325, 326, 328, 330 in order to establish the session 332.

Because the mobile device 304 in this example is not controlling the state of the general-purpose device 306, the mobile device 304 may need to continually listen for advertisements (e.g., SSDP Alive) from the general-purpose device 306, and act once the advertisements have not been received for a predetermined amount of time. Here, the mobile device detects 334 a timeout due to lack of SSDP Alive messages from the general-purpose device 306, and the presence state is updated 336 appropriately. Thereafter, a connection attempt 338 directed to the mobile device 304 will cause the device 304 to determine 340 the current presence state, and respond 342, 344, 346 appropriately to establish a session 348.

It will be appreciated that embodiments of the invention may employ many variations of the example scenarios shown in FIGS. 2 and 3. For example, in FIG. 3, the alternate device 308 and general-purpose device 306 may be one in the same. Other states of the general-purpose device 306 besides "present" and "absent" may also be detected via service announcements. For example, the alternate device 308 and general-purpose device 306 may be a UPnP enabled PSTN phone with call waiting. In such an example, calls may be forwarded 322 to the phone 308 only when the user 302 is talking on the phone 308 (e.g., device 306 state is "connected" or similar). In this way, the user 302 can deal with incoming calls to the mobile device 304 using the call waiting feature of the phone 308 without having to juggle two devices 304, 308.

Figure 4:
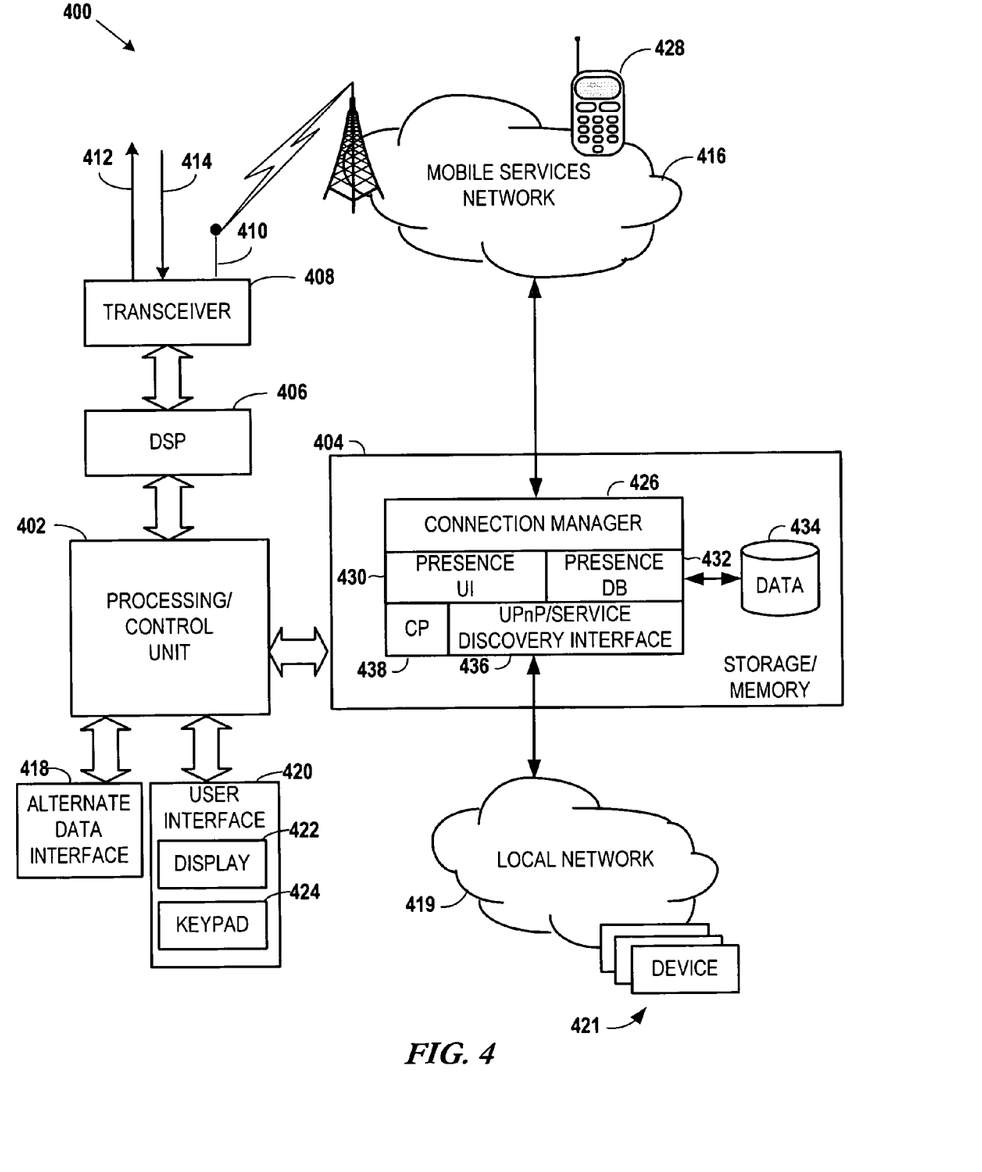
FIG. 4 is a block diagram of a mobile device according to embodiments of the invention.

A user device that includes capabilities according to embodiments of the invention is shown as a mobile computing arrangement 400 in FIG. 4. Those skilled in the art will appreciate that the exemplary mobile computing arrangement 400 is merely representative of general functions that may be associated with such mobile devices, and also that landline computing systems similarly include computing circuitry to perform such operations.

The processing unit 402 controls the basic functions of the arrangement 400. Those functions associated may be included as instructions stored in a program storage/memory 404. In one embodiment of the invention, the program modules associated with the storage/memory 404 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 400 via data signals, such as being downloaded electronically via one or more networks, such as the Internet and an intermediate wireless network(s).

The mobile computing arrangement 400 includes hardware and software components coupled to the processing/control unit 402 for performing network data exchanges. The mobile computing arrangement 400 may include multiple network interfaces for maintaining any combination of wired or wireless data connections. For example, the illustrated mobile computing arrangement 400 may includes wireless data transmission circuitry for performing network data exchanges with a mobile communications infrastructure.

This wireless circuitry includes a digital signal processor (DSP) 406 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 408, generally coupled to an antenna 410, transmits the outgoing radio signals 412 and receives the incoming radio signals 414 associated with the wireless device.

The incoming and outgoing radio signals 412, 414 to communicate with a mobile services network 416. The network 416 may include any voice and data communications infrastructure known in the art, including CDMA, W-CDMA, GSM, EDGE, etc. The network 416 may also include short-range networks, using technologies such as 802.11 Wireless Local Area Network (WAN), Ultrawideband (UWB), Bluetooth, etc. The transceiver 408 may be adapted to communicate via these short-range networks 416, or the arrangement 400 may include an alternate data interface 418 for purposes of connecting to such networks. The alternate data interface 418 may include any combination of wired or wireless data communications circuitry coupled to the processor 402 for purposes of communicating with devices on the network 416. The alternate data interface 418 may also be capable of communicating via a local network 419, such as a home or office network. In particular, the local network 419 may support service discovery that can be used to determine states of devices 421 on the network 419.

The processor 402 is also coupled to user-interface elements 420 associated with the mobile terminal 400. The user-interface 420 of the mobile terminal 400 may include, for example, a display 422 such as a liquid crystal display. Other user-interface mechanisms may be included in the interface 420, such as keypads 424, speakers, microphones, voice commands, switches, touch pad/screen, graphical user interface using a pointing device, trackball, joystick, etc. These and other user-interface components are coupled to the processor 402 as is known in the art.

The program storage/memory 404 typically includes operating systems for carrying out functions and applications associated with functions on the mobile computing arrangement 400. The program storage 404 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 404 of the mobile computing arrangement 400 may also include software modules for performing functions according to embodiments of the present invention.

In particular, the program storage/memory 404 may include a connection manager 426 for communicating with a communications device 428 of the mobile services network 416. In particular, the connection manager 426 may receive connection requests from the communications device 428. The communications device may be directly coupled to the mobile services network 416, and/or may access the connection manager 426 directly or indirectly through other networks (e.g., PSTN, Internet).

The connection manager 426 handles (e.g., accepts, rejects, forwards) incoming connection requests based on a local presence state of the device 400. This presence state is obtained from a presence user interface (UI) 430 and/or a presence database interface 432. The presence UI 430 and database interface 432 may include a machine readable interface (e.g., an application program interface) that allows other software components to determine presence state. The presence UI 430 may also include a human-readable interface for setting/modifying presence state, such as via user interface hardware 420. The presence database interface 432 is used to control the loading and storing of presence data from/to a persistent storage 434.

The presence UI 430 is capable of communicating with a service discovery interface 436. The service discovery interface 436 is capable of determining selected states of devices 421 using service discovery mechanisms available on the local network 419. Typically, this network 419 supports TCP/IP, and thus can be used for most service discovery protocols, including SSDP/UPnP, SLP, Jini, etc. The presence UI 430 and service discovery interface 436 coordinate the detection of network device state so that, when predetermined state changes are detected, this is communicated to the presence UI 430 for purposes of updating a local presence state. The service discovery interface 436 may discover state changes synchronously, such as be regular polling of devices by the interface 436. This state change may also be discovered asynchronously, such as by spontaneous announcements on the local network 419.

The arrangement 400 may also discover device states by acting as a controller device (e.g., UPnP Control Point) to change states of one or more of the devices 421. This functionality is represented by the control point interface 438. This control point interface 438 may share functionality with the service discovery interface 436, such as the lower level network and service discovery protocols. The control point interface 438 may include additional features, such as a user interface that provides user access to control functions via user interface hardware 420.

Figure 5:
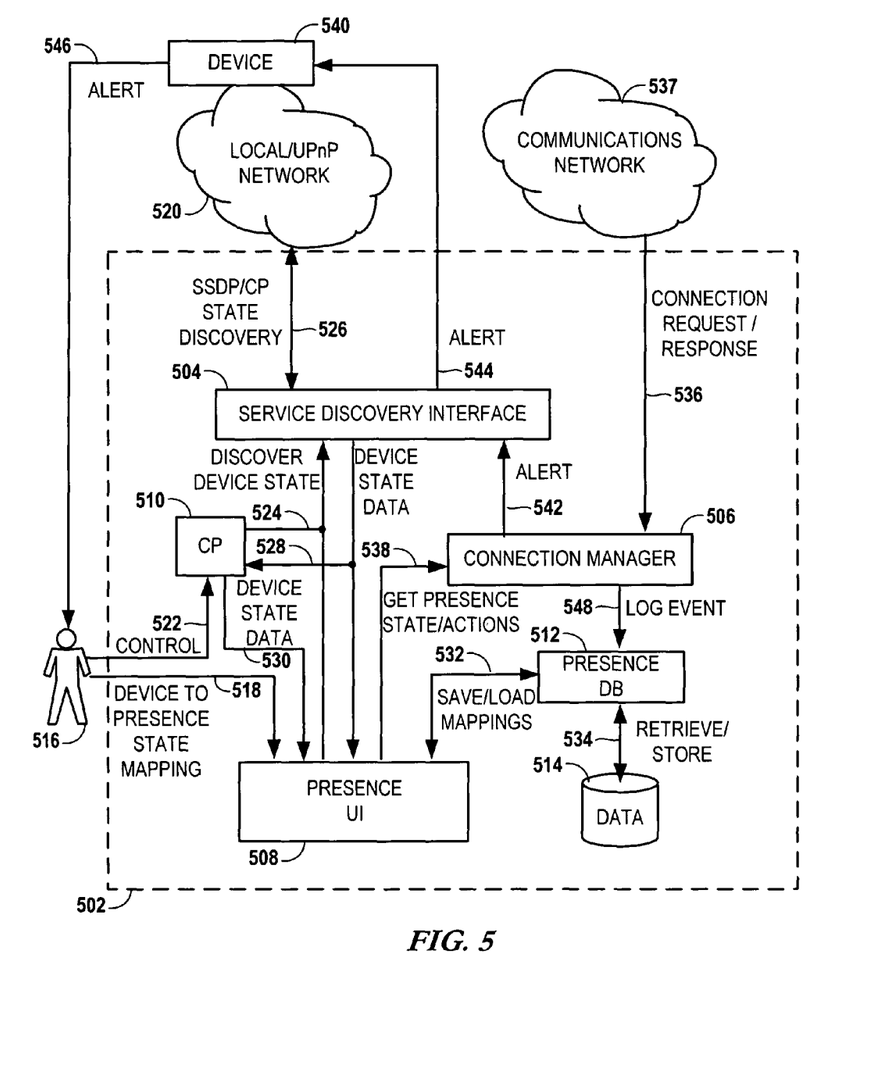
FIG. 5 is a block diagram of interactions between functional components according to embodiments of the invention.

A more detailed example of interactions between software components on a mobile device according to the embodiments of the invention is shown in the block diagram of FIG. 5. The illustrative components are part of a system function 502 that may either be a single physical device or a logical entity that runs on two or more physical devices. Some of the functional components are analogous to those described in relation to FIG. 4, and include a service discovery interface 504, a connection manager 506, a presence UI 508, a control point component 510, a presence database interface 512, and a data store 514.

The function 502 provides ways for a user 516 to control aspects of presence. The presence UI 508 allows the user 516 to create mappings 518 between states of devices on a local network 520 and local presence states associated with the user 516. The mappings can be retrieve from and saved to data storage 514 via presence database interface 512, as indicated by paths 532 and 534. The user 516 may also (optionally) interface with the control point 510 to send commands 522 to control the operation of devices on the local network 520. The control point 510 may be a UPnP Control Point, or may use any other open or proprietary control commands. The control point 510 and presence UI 508 can request device states by way of the service discovery interface 504, as indicated by path 524. In response, the service discovery interface 504 determines states via the local network 520, as indicated by path 526. This state data is returned to the presence UI 508 and/or control point 510 as indicated by path 528. Where the control point 510 is solely responsible for determining device state, this state data may be communicated to the presence UI 508 as indicated by path 530.

The presence UI 508 uses the device states obtained via the service discovery interface 504 in combination with the mappings provided by the user 516 to determine presence for any combination of device states. When the connection manager 506 receives incoming connection requests 536 from a communications network 537, the presence state is determined at the presence UI 508 using the current device state(s). The presence data and/or any appropriate response actions are communicated to the connection manager 506, as indicated by path 538. The connection manager 506 then responds according to the current presence state and actions assigned to those states.

The connection manager 506 may respond to the incoming connection request 536 by accepting the connection, rejecting the connection, forwarding/redirecting the connection, asking for additional information, etc. One response that might be appropriate in response to the incoming connection request 536 is to perform some action on a device 540 of the local network 520. Here, the response is shown as an alert 542, but any device command may be possible. The alert 542 is first sent to the service discovery interface 504 (or to the control point 510, if one is utilized) which directs the alert to the device 540 where it is perceived by the user 516, as represented by paths 544, 546. The connection manager 506 may also log such events to data storage 514, as shown by path 548. This logged data may be used, for example, to inform the user 516 of missed connections after a presence state change is detected or applied.

Figure 6:
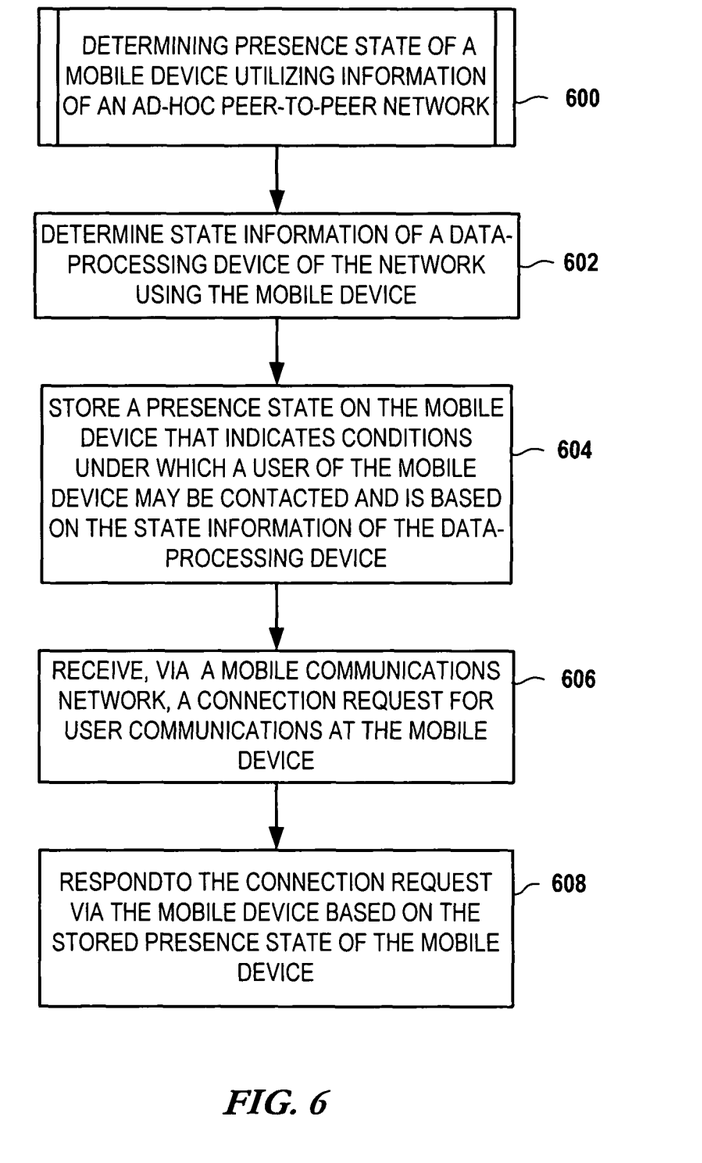
FIG. 6 is a flowchart illustrating a method for determining presence state of a mobile device using information of an ad-hoc, peer-to-peer network according to embodiments of the invention.

In reference now to FIG. 6, a flowchart illustrates a procedure 600 for utilizing information of an ad-hoc peer-to-peer network for determining presence state of a mobile device. State information of a data-processing device of the network is determined 602 using the mobile device. A presence state is stored 604 on the mobile device. The presence state indicates conditions under which a user of the mobile device may be contacted, and the presence state is based on the state information of the data-processing device. A connection request is received 606 a mobile communications network. The connection request is for user communications at the mobile device. The mobile device responds 608 to the connection request via the mobile device based on the stored presence state of the mobile device.

Figure 7:
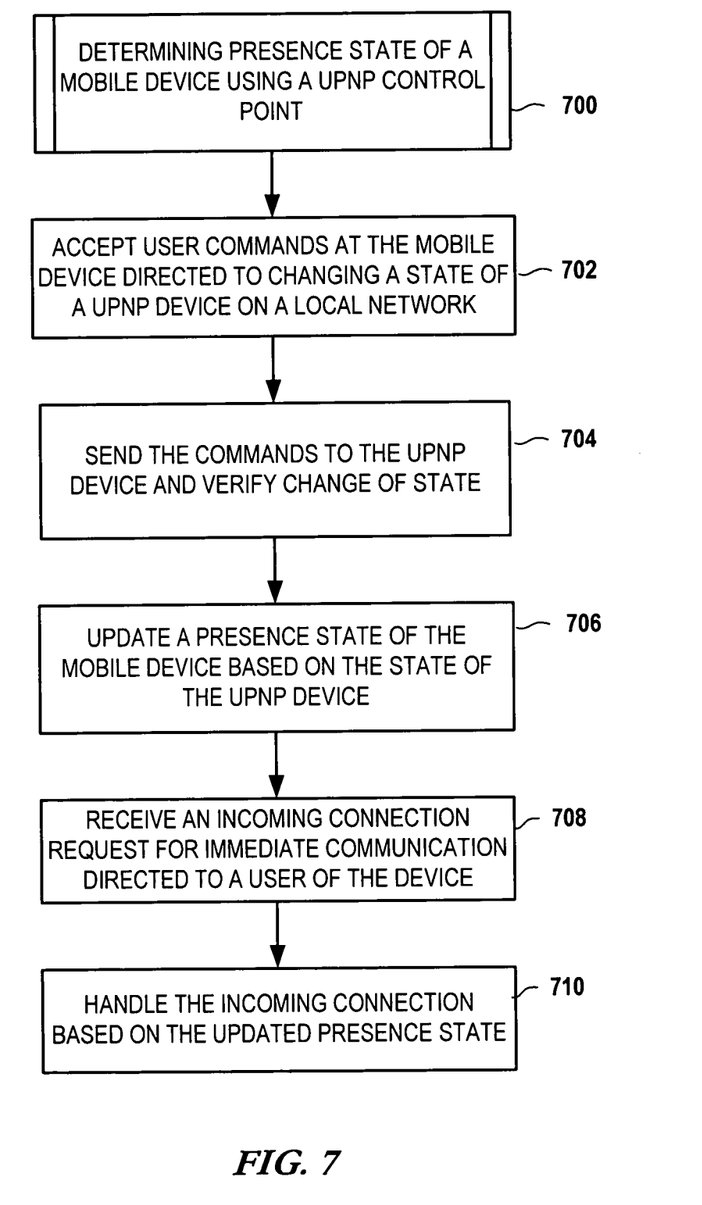
FIG. 7 is a flowchart illustrating a method for determining presence state of a mobile device using a UPnP Control Point according to embodiments of the invention.

In reference now to FIG. 7, a flowchart illustrates a procedure 700 for using a UPnP control point to determine presence state of a mobile device. The mobile device accepts 702 user commands directed to changing a state of a UPnP device on the local network. For example, the UPnP device may be a media playback device, and the commands may be directed to affecting playback states. The commands are sent 704 to the UPnP device and the state changes are verified. In response, the presence state of the mobile device is updated 706 based on the state of the UPnP device. An incoming connection for immediate communications with the device's user is then received 708, and the mobile device handles 710 the incoming connection request based on the updated presence state.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising:
   determining to couple a mobile device to a local network;
   determining state information of a data-processing device via the local network using the mobile device,
      wherein the state information includes a function being performed by the data-processing device; and
   determining, at the mobile device, a presence state of the mobile device based on the state information of the data-processing device,
      wherein the presence state indicates conditions under which the mobile device is contacted via a mobile communication network.

2. The method of claim 1, further comprising:
   receiving, via the mobile communications network, a connection request for user communications at the mobile device; and determining to respond to the connection request via the mobile device based on the presence state of the mobile device.

3. The method of claim 2, wherein responding to the connection request based on the presence state of the mobile device comprises determining to reject the connection request.

4. The method of claim 2, wherein determining to respond to the connection request based on the presence state of the mobile device comprises determining to send a predetermined busy message to an originator of the connection request.

5. The method of claim 2, wherein determining to respond to the connection request via the mobile device based on the presence state of the mobile device comprises determining to change a user alert associated with the connection request.

6. The method of claim 5, wherein determining to change the user alert associated with the connection request comprises determining to redirect the user alert to a device of the mobile communication network.

7. The method of claim 2, wherein receiving the connection request for user communications at the mobile device comprises receiving a request for at least one of a phone call, a text message, a calendar notification, and a device status notification.

8. The method of claim 1, further comprising determining to control the data-processing device via the mobile device, and wherein determining the state information of the data-processing device comprises determining the state information based on control actions initiated via the mobile device.

9. The method of claim 8, wherein the data-processing device comprises a media playback device, and wherein determining the state information based on the control actions initiated via the mobile device comprises determining the state information based on a playback state of the media playback device.

10. The method of claim 1, wherein determining to couple the mobile device to the local network comprises determining to couple the mobile device to a Universal Plug and Play network.

11. The method of claim 1, wherein the mobile device comprises at least one of a mobile phone, a personal digital assistant, a media playback device, a digital camera, a global position satellite navigation unit, and a game device.

12. The method of claim 1, wherein the data-processing device comprises at least one of a television, a gaming console, a personal computer, a server, a data storage device, a video camera, an audio playback device, and a video playback device.

13. The method of claim 1, wherein determining the state information of the data-processing device comprises determining the state information via an ad-hoc, peer-to-peer protocol of the local network.

14. An apparatus, comprising:
a first network interface configured for communicating via a mobile communications network;
a second network interface configured for communicating via a local network;
a processor coupled to the first and second network interfaces; and
a memory coupled to the processor, the memory including instructions operable by the processor to cause the apparatus to,
determine, via the second network interface, state information of a data-processing device of the local network, wherein the state information includes a function being performed by the data-processing device, and
determine, based on the state information of the data-processing device, a presence state of the apparatus that indicates conditions under which the apparatus is contacted via the mobile communication network.

15. The apparatus of claim 14, wherein the instructions are further operable by the processor to cause the apparatus to,
receive a connection request for user communications via the first network interface, and
determine to respond to the connection request via the first network interface based on the presence state.

16. The apparatus of claim 15, wherein receiving the connection request for user communications via the first network interface comprises receiving a request for at least one of a phone call, a text message, a calendar notification, and a device status notification.

17. The apparatus of claim 14, further comprising a control module configured for controlling the data-processing device via an ad-hoc, peer-to-peer network protocol of the local network, and wherein the instructions are further operable by the processor to cause the apparatus to determine the state information of the data-processing device based on control actions initiated via the control module.

18. The apparatus of claim 17, wherein the data-processing device comprises a media playback device, and wherein the instructions are further operable by the processor to cause the apparatus to determine the state information based on a playback state of the media playback device.

19. The apparatus of claim 14, wherein the local network comprises a Universal Plug and Play network.

20. The apparatus of claim 14, wherein the mobile communications network comprises a cellular phone network.

21. The apparatus of claim 14, wherein the apparatus comprises at least one of a mobile phone, a personal digital assistant, a media playback device, a digital camera, a global position satellite navigation unit, and a game device.

22. The apparatus of claim 14, wherein the data-processing device comprises at least one of a television, a gaming console, a personal computer, a server, a data storage device, a video camera, an audio playback device, and a video playback device.

23. A non-transitory computer-readable medium carrying one or more sequences of one or more instructions which, when executed by one or more processors, cause an apparatus to at least perform the following steps:
determining state information of a data-processing device coupled via a local network to the apparatus, wherein the state information includes a function being performed by the data-processing device; and
determining, based on the state information of the data-processing device, a presence state of the apparatus that indicates conditions under which the apparatus is contacted via a mobile communication network.

24. The non-transitory computer readable medium of claim 23, wherein the apparatus is further caused to perform:
receiving a connection request for user communications via the mobile communications network; and
determining to respond to the connection request via the mobile communications network based on the presence state.

25. The computer-readable medium of claim 23, wherein determining the state information of the data-processing device comprises determining the state information via an ad-hoc, peer-to-peer protocol of the local network.

26. A system comprising:
a data processing device;
a mobile device configured for being coupled to a local network configured for receiving connection requests via a mobile communications network, the mobile device including:
a memory coupled to a processor, the memory including instructions operable by the processor to cause the mobile device to,
determine, via the local network, state information of the data-processing device, wherein the state information includes a function being performed by the data-processing device, and
determine, based on the state information of the data-processing device, a presence state of the apparatus that indicates conditions under which the mobile device will accept the connection requests.

27. The system of claim 26, wherein the instructions of the mobile device further cause the mobile device to respond to the connection requests via the mobile communications network based on the presence state.

28. The system of claim 26, wherein the mobile device further comprises a control module configured for controlling the data-processing device using an ad-hoc, peer-to-peer protocol of the local network, and wherein instructions cause the mobile device to determine the state information of the data-processing device comprises determining the state information based on control actions initiated via the control module.

29. The system of claim 26, wherein the mobile device comprises at least one of a mobile phone, a personal digital assistant, a media playback device, a digital camera, a global position satellite navigation unit, and a game device.

30. The system of claim 26, wherein the data-processing device comprises at least one of a television, a gaming console, a personal computer, a server, a data storage device, a video camera, an audio playback device, and a video playback device.

31. A system, comprising:
means for coupling a mobile device to a local network;
means for determining state information of a data-processing device via the local network using the mobile device, wherein the state information includes a function being performed by the data-processing device; and
means for forming, at the mobile device, a presence state of the mobile device based on the state information of the data-processing device, wherein the presence state indicates conditions under which the mobile device is contacted via a mobile communication network.

32. An apparatus, comprising:
at least one processor; and
at least one memory including computer program code for one or more programs,
the at least one memory and the computer program code configured to, with the at least one processor, cause the apparatus to perform at least the following,
determine state information of a data-processing device of a local network coupled to the apparatus, wherein the state information includes a function being performed by the data-processing device, and
determine, based on the state information of the data-processing device, a presence state of the apparatus that indicates conditions under which the apparatus is contacted via a mobile communication network.

33. The apparatus of claim 32, wherein determining the state information of the data-processing device comprises determining the state information via an ad-hoc, peer-to-peer protocol of the local network.

* * * * *